(12) United States Patent
Paul

(10) Patent No.: US 6,845,942 B2
(45) Date of Patent: Jan. 25, 2005

(54) OMNI-DIRECTIONAL AIR VEHICLE PERSONAL TRANSPORTATION SYSTEM

(76) Inventor: Marius A. Paul, 1120 E. Elm Ave., Fullerton, CA (US) 92631

( * ) Notice: Subject to any disclaimer, the term of this patent is extended or adjusted under 35 U.S.C. 154(b) by 0 days.

(21) Appl. No.: 10/371,680

(22) Filed: Feb. 20, 2003

(65) Prior Publication Data

US 2004/0061022 A1 Apr. 1, 2004

Related U.S. Application Data

(60) Provisional application No. 60/361,544, filed on Mar. 4, 2002, and provisional application No. 60/358,825, filed on Feb. 21, 2002.

(51) Int. Cl.[7] .............................................. B64C 15/00
(52) U.S. Cl. ....................... 244/12.2; 244/17.11; 244/21
(58) Field of Search .......................... 244/12.2, 17.11, 244/21, 23 C, 12.4, 23 B, 72

(56) References Cited

U.S. PATENT DOCUMENTS

| | | | | | |
|---|---|---|---|---|---|
| 2,745,498 | A | * | 5/1956 | Nagler | 416/21 |
| 2,952,422 | A | * | 9/1960 | Fletcher et al. | 244/12.2 |
| 3,082,977 | A | * | 3/1963 | Max | 244/17.23 |
| 3,181,811 | A | * | 5/1965 | Maksim, Jr. | 244/12.2 |
| 3,276,723 | A | * | 10/1966 | Miller et al. | 244/12.2 |
| 3,606,570 | A | * | 9/1971 | Haggerty | 416/2 |
| 4,537,372 | A | * | 8/1985 | Forizs | 244/12.4 |
| 4,653,705 | A | * | 3/1987 | Bensen | 244/17.11 |
| 4,941,628 | A | * | 7/1990 | Sakamoto et al. | 244/12.2 |
| 5,178,344 | A | * | 1/1993 | Dlouhy | 244/12.2 |
| 5,190,242 | A | * | 3/1993 | Nichols | 244/12.2 |
| 5,226,350 | A | * | 7/1993 | Cycon et al. | 74/665 F |
| 5,295,643 | A | * | 3/1994 | Ebbert et al. | 244/7 B |
| 5,351,913 | A | * | 10/1994 | Cycon et al. | 244/60 |
| 5,419,513 | A | * | 5/1995 | Flemming et al. | 244/12.2 |
| 5,419,514 | A | * | 5/1995 | Ducan | 244/12.4 |
| 5,653,404 | A | * | 8/1997 | Ploshkin | 244/12.2 |
| 5,765,776 | A | * | 6/1998 | Rogers et al. | 244/12.2 |
| 6,179,247 | B1 | * | 1/2001 | Milde, Jr. | 244/23 A |
| 6,270,038 | B1 | * | 8/2001 | Cycon et al. | 244/12.3 |
| 6,343,768 | B1 | * | 2/2002 | Muldoon | 244/7 R |
| 6,450,445 | B1 | * | 9/2002 | Moller | 244/23 A |
| 6,691,949 | B2 | * | 2/2004 | Plump et al. | 244/12.2 |
| 6,719,244 | B1 | * | 4/2004 | Gress | 244/7 R |

* cited by examiner

Primary Examiner—Teri P. Luu
Assistant Examiner—Stephen A. Holzen
(74) Attorney, Agent, or Firm—Richard Esty Peterson

(57) ABSTRACT

An omni-directional air vehicle having a pod with a connected turbofan system, the pod has a body that contains a power source for generating electrical power and a ducted fan with spherical articulation mechanism having a projecting arm with counter-rotating propellers and a ducted shroud around the periphery of the counter rotating propellers and containing drive motors for electrically driving the propellers.

11 Claims, 6 Drawing Sheets

US 6,845,942 B2

OMNI-DIRECTIONAL AIR VEHICLE PERSONAL TRANSPORTATION SYSTEM

RELATED APPLICATIONS

This application claims the benefit of provisional application Ser. No. 60/361,544, filed on Mar. 4, 2002 and Ser. No. 60/358,825, filed on Feb. 21, 2002.

BACKGROUND AND SUMMARY OF THE INVENTION

This invention relates to a new air vehicle having omni-directional flying capabilities. The vehicle can sit motionless in air or on land, and, depart to and land from all positions and directions, including vertical take-off and landing (VTOL). The invented vehicle is a universal mobility air vehicle.

The PTS can replace any and all cars, vans, motorcycles, helicopters, business airplanes, or any vehicles military and commercial. The omni-directional vehicle is an absolute revolutionary, universal transportation system for solving our modern, vehicle-congested urban environment.

The modular association of multiple omni-directional vehicles in an integrated structural apparatus provides a universal propulsion system for flying platforms, air lift vehicles, combined multi-functional operations, individual flying vehicles, and unlimited applications which need flexible capabilities for emergency and special forces.

For military use in the rapid deploying of forces, fuel and all other the logistic supplies for armored vehicles isolated in places without lines of communication, the modularized air lift system can be invaluable.

A first characteristic of the novel omni-directional air vehicle is a thermal-electric, hybrid propulsion system using the power source technology of our U.S. Pat. No. 6,282,897, issued Sep. 4, 2001, entitled Advanced Thermo-Electronic Systems For Hybrid Electric Vehicles, and incorporated herein by reference.

A second characteristic is the use of a counter-rotating, counter-electric, turbofan system, driven by the thermal electric power source with double ring permanent magnets in hollow concentric motors.

A third characteristic is an omni-directional articulation between the turbo-electric, counter-rotating fan and the main body of the vehicle, permitting a universal adjustment of the relative direction of the turbofan, and thereby providing the vehicle with universal mobility.

BRIEF DESCRIPTION OF THE DRAWINGS

FIG. 4B is a further schematic view of the alternate omni-directional air vehicle of FIG. 4a.

FIG. 5B is a further schematic view of the alternate omni-directional air vehicle of FIG. 5a.

FIG. 6B is a further schematic view of the alternate omni-directional air vehicle of FIG. 6a.

DETAILED DESCRIPTION OF THE PREFERRED EMBODIMENTS

Figure 1:
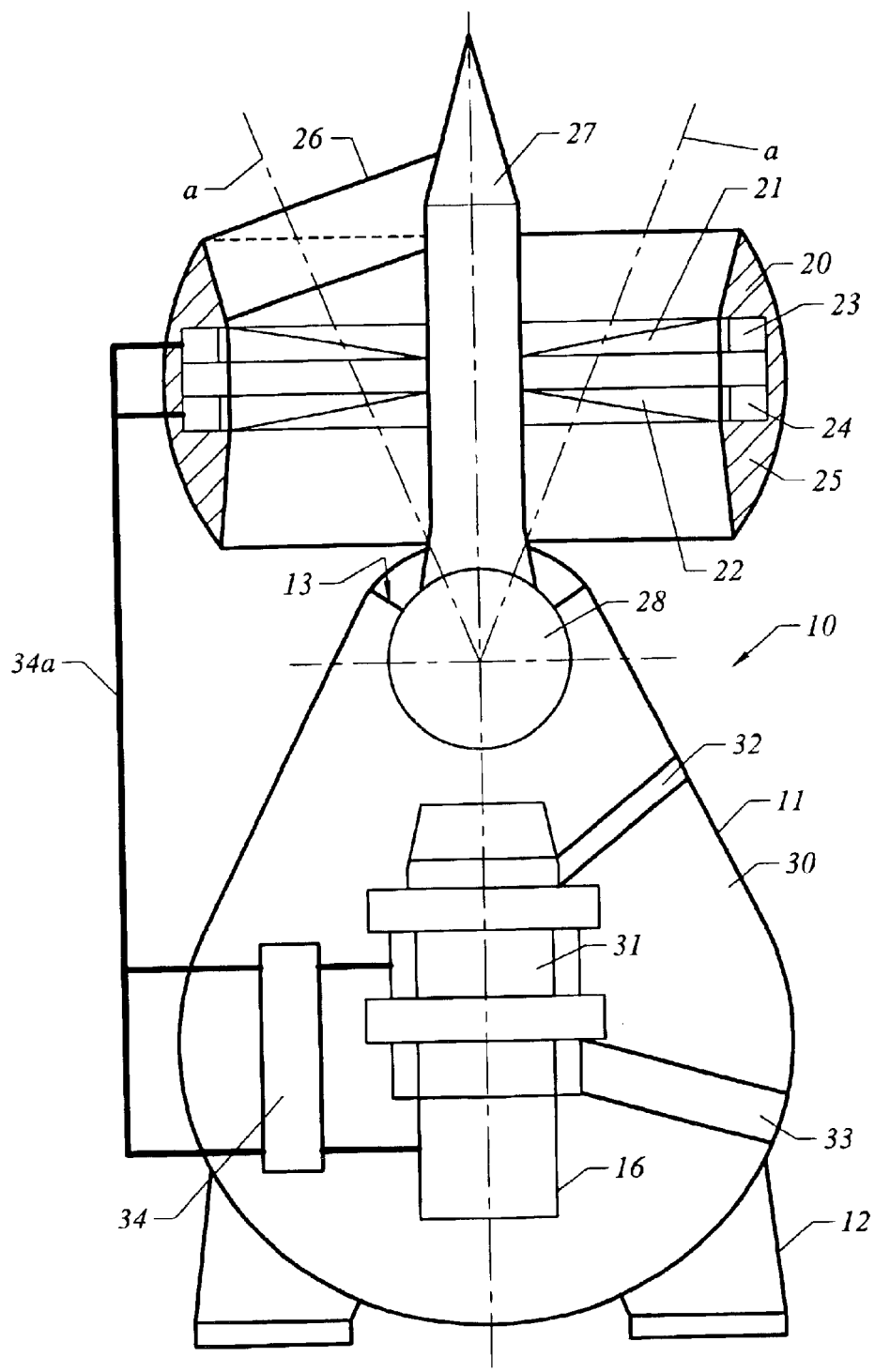
FIG. 1 is a schematic view of the omni-directional air vehicle of this invention.

In FIG. 1, the omni-directional air vehicle, depicted generally by the number 10, comprises a pod 11 with pod supports 12, and a connected turbofan system 16 having a turbo-electric, counter-rotating ducted fan 20 provided with two counter-rotating propellers 21 and 22, peripherally driven by counter-rotating, permanent magnet, electric motors 23 and 24, integrated in a ducted shroud 25, supported by struts 26 connected to a projecting arm 27 of a spherical articulation mechanism 28 seated in the main body 30 of the pod 11 of the vehicle 10. The spherical articulatory mechanism 28 changes the angular position of the projecting arm 27 to the angle "a" as limited by stop 13 at the top of main body 30.

In the main body 30, is located a combination thermal electric engine and gas turbine 31, of the type described in the referenced U.S. Pat. No. 6,282,897. The combination thermal electric engine and gas turbine 31 is provided with air intake ports 32 and exhaust ports 33 and in out put generator 16 supplies the electric power through an electronic control module 34 to the counter-rotating electric motors 23 and 24 through electric circuit line 34a.

The ability to change the relative angular position (a) between the turboelectric counter-rotating ducted fan 20 and the main body 30 allows the vehicle to perform all flying missions from all positions in all directions, including ground and air, from on-board control systems, wherein the vehicle has a universal mobility.

The ultra high efficiency of the engines and gas turbines, as described in the referenced U.S. patent, provides the absolute best performance for military applications, such as unmanned aerial vehicles (UAV) and commercial applications for better cargo and personnel transports than actual helicopters or business airplanes.

Figure 2:
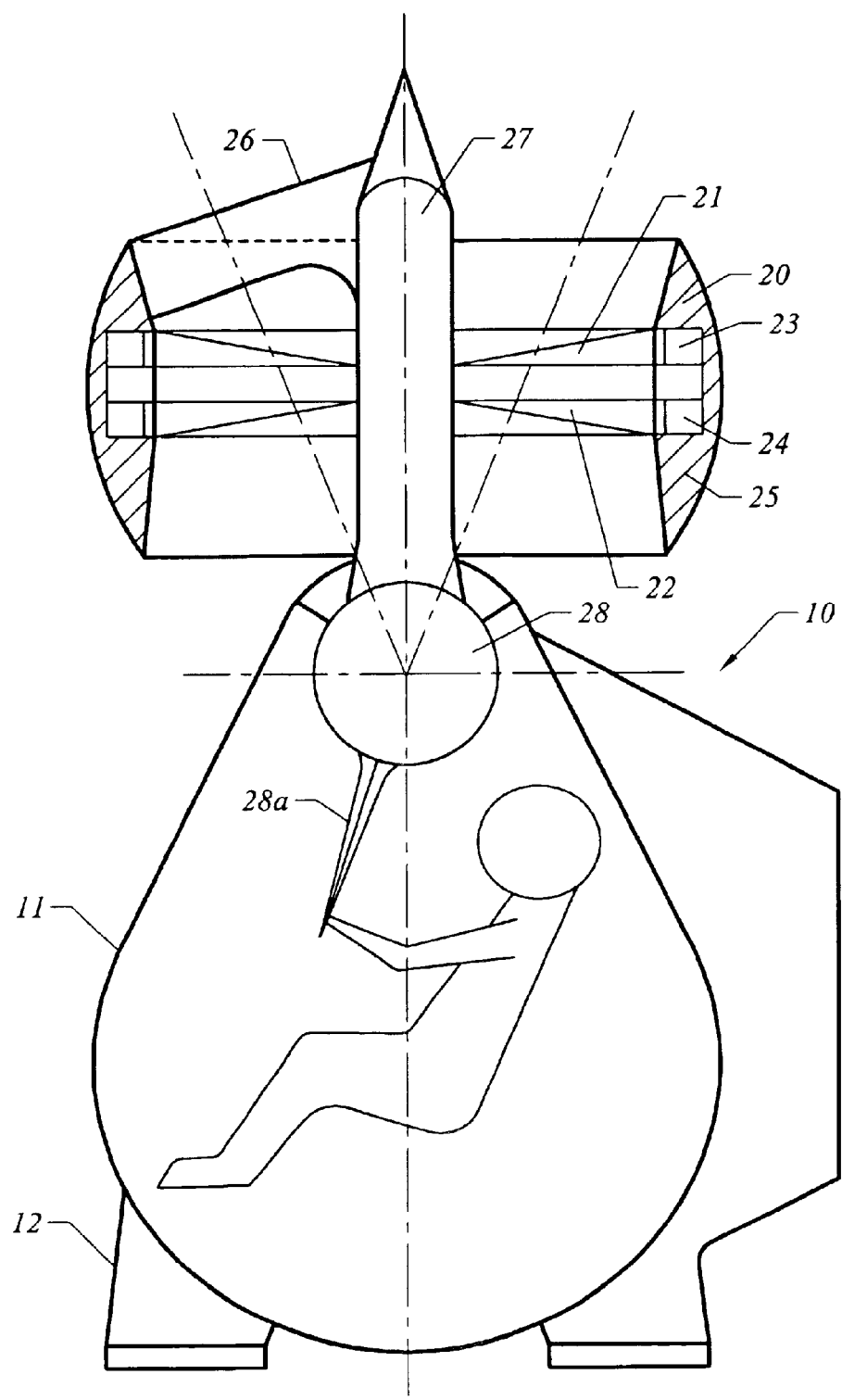
FIG. 2 is a schematic view of the omni-directional air vehicle adapted for personal transport.

In FIG. 2 there is depicted a configuration of the same omni-directional vehicle used as a personal transportation system (PTS) which is designed to accommodate a person or multiple persons. Manual control of the spherical articulation mechanism is accomplished by control arm 28a.

Figure 3:
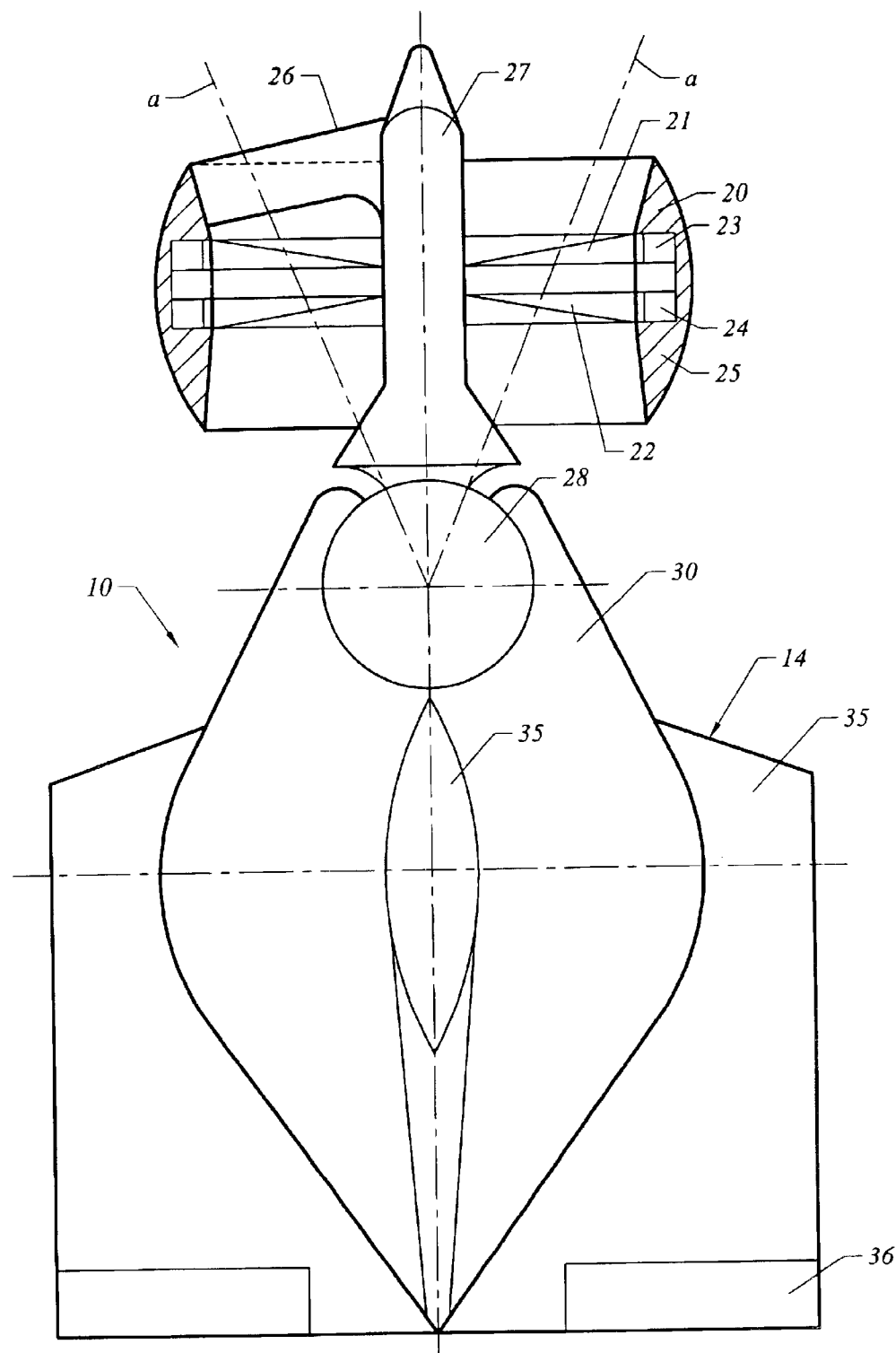
FIG. 3 is a schematic view of an alternate omni-directional air vehicle.

FIG. 3 depicts a special configuration of the omni-directional air vehicle 10 with the ability to fly horizontally at high speed facilitated by the addition of a cruciform 14 having wings 35 which have directional guides 36 that are active only in horizontal high speed operation.

Figure 4A:
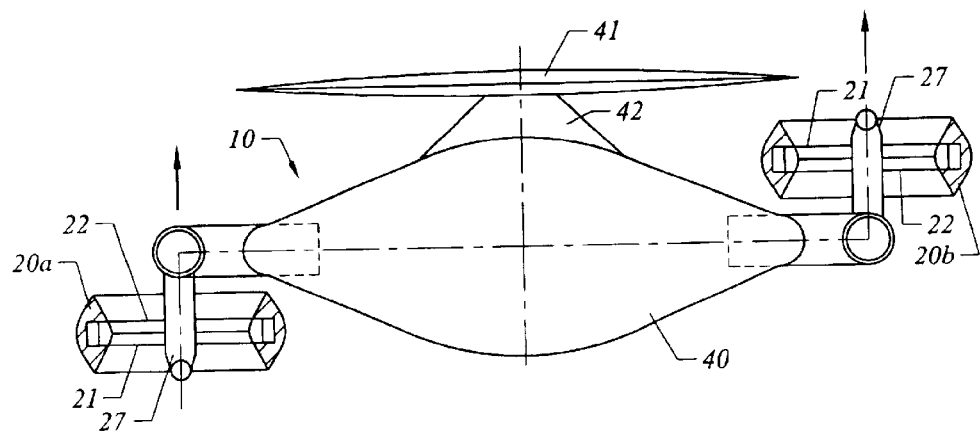
FIG. 4A is a schematic view of a further alternate omni-directional air vehicle.
Figure 4B:
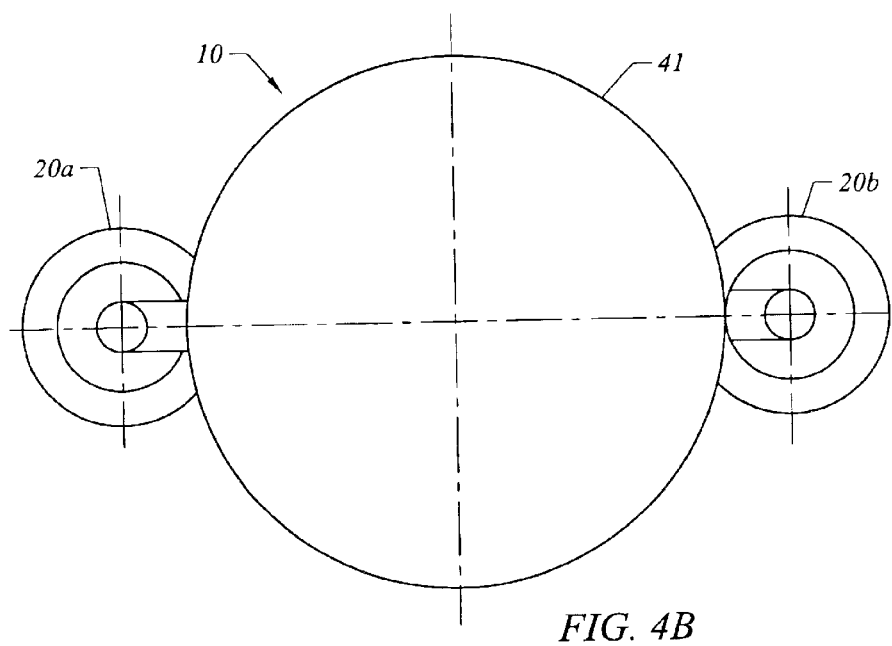

FIGS. 4A and 4B depict the omni-directional air vehicle 10 with a discoid shape vehicle body 40 attached to a round fixed wing 41 connected with the dome 42 and at least two electric ducted fans 20a (push) and 20b (pull) with counter-rotating propellers 21 and 22, each fan being attached with a projecting arm 27. Once the vehicle is converted to horizontal flight, both turbo-electric, counter-rotating ducted fans 20a and 20b are horizontally arranged in the same push-pull actions per the direction of flight. The omni-directional air vehicle flight capability is improved by the round discoid wing 41 which uses less energy and has less drag at high speed in the horizontal mode. Additionally, the round discoid wing 41 can be used on gliding flight.

Figure 5A:
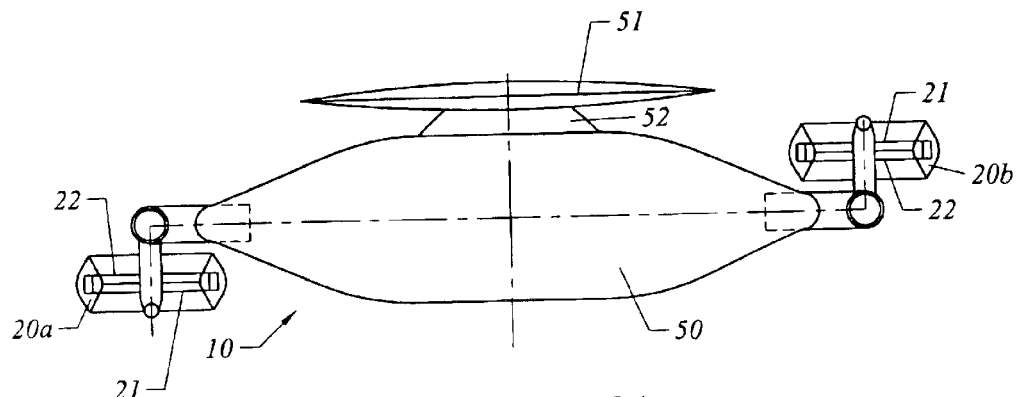
FIG. 5A is a schematic view of a further alternate omni-directional air vehicle.
Figure 5B:
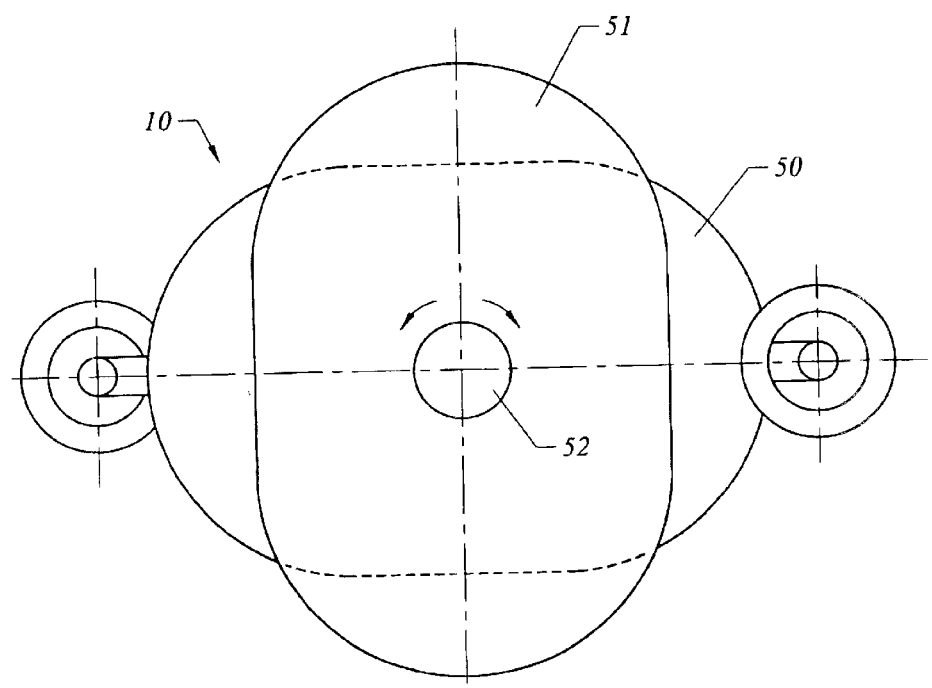

FIGS. 5A and 5B depict the omni-directional air vehicle 10 having an elongated fuselage 50 attached to an adjustable elongated wing 51 able to be rotary arranged always perpendicular to the direction of flight. The same turbo-electric, counter-rotating ducted fans 20a and 20b with counter-rotating propellers 21 and 22 in a push-pull arrangement form the omni-directional air vehicle propulsion system.

Figure 6A:
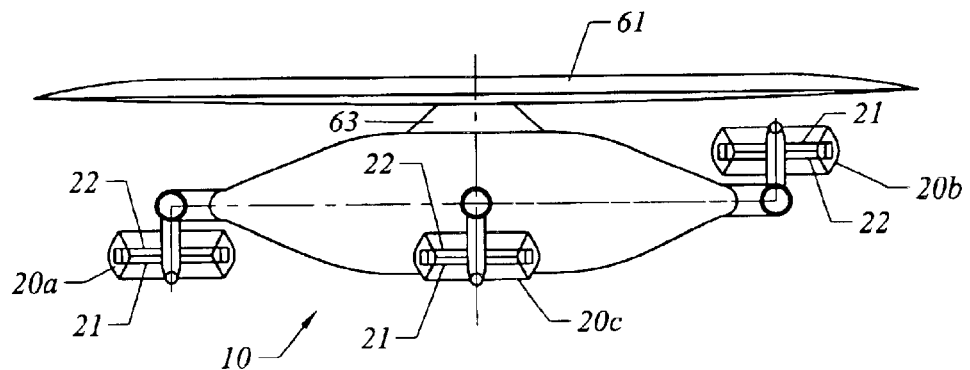
FIG. 6A is a schematic view of a further alternate omni-directional air vehicle.
Figure 6B:
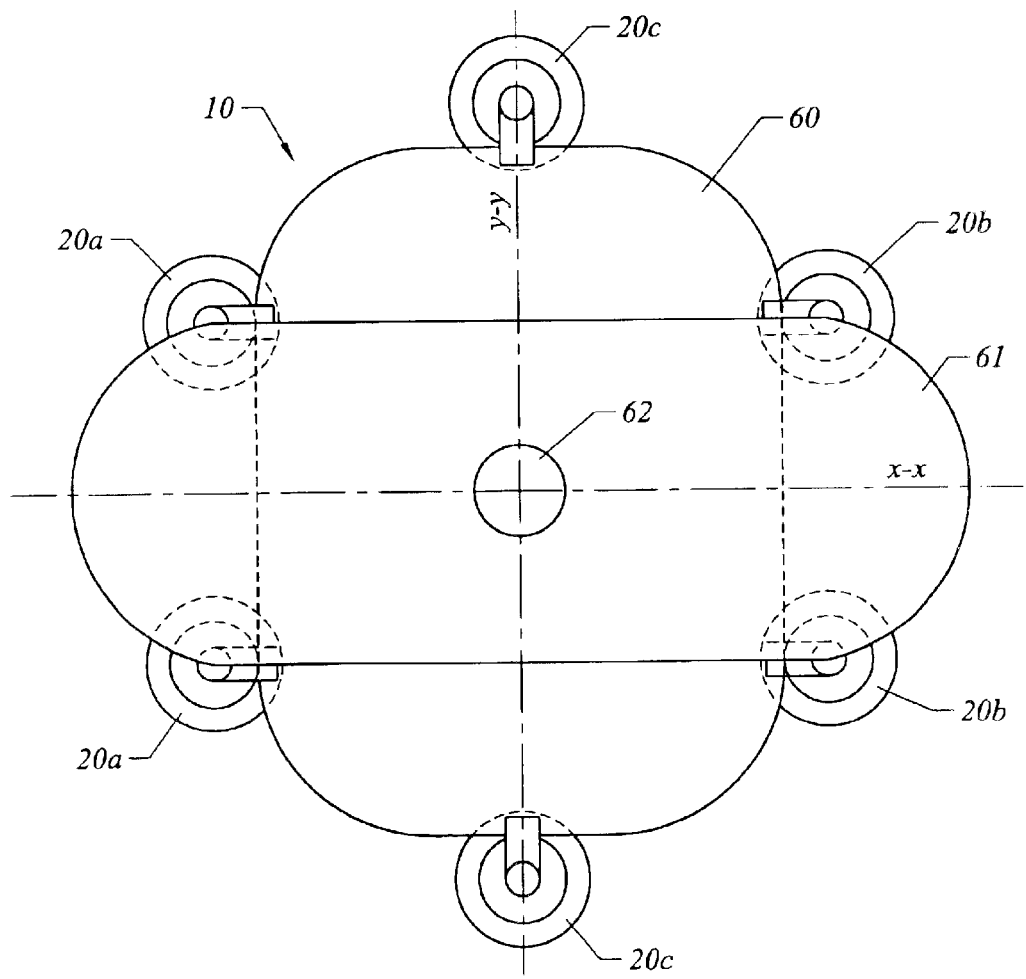

FIGS. 6A and 6B depict the omni-directional air vehicle 10 having an adjustable (rotary) platform body 60 associated with platform wing 61 articulated by pivot dome 63 and the shaft 62. The axial position x-x will always be perpendicular with the axial y-y of the body 60 per flight direction. The same turbo-electric, counter-rotating ducted fans 20*a*, 20*b* and 20*c* with counter-rotating propellers 21 and 22 will cooperate in a combined push-pull action for the omni-directional air vehicle direction of flight. The omni-directional air vehicle is designed to accommodate a person or multiple persons.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An omni-directional air vehicle comprising:

a pod;

a turbofan system having an articulated connection to the pod, the turbofan system having a ducted fan with counter rotating propellers, a spherical articulation mechanism with a projecting arm on which the propellers are mounted, and a shroud with struts connected to the projecting arm, wherein the pod has a body with the spherical articulation mechanism begin seated in the body of the pod, with the projecting arm projecting from the pod and with the spherical articulation mechanism having means for limited articulation of the projecting arm relative to the pod wherein the angular position of the turbofan system relative to the pod is changeable, and the ducted fan has counter-rotating electric motors driving the counter-rotating propellers; and, a power source connected to the counter-rotating electric motors.

2. The omni-directional air vehicle of claim 1 wherein the means for limited articulation of the projecting arm of the spherical articulation mechanism comprises a control arm in the pod that is connected to the spherical articulation mechanism for manual operation.

3. The omni-directional air vehicle of claim 1 wherein the pod has supports for supporting the pod.

4. The omni-directional air vehicle of claim 1 wherein the pod has wings with directional guides for horizontal operation.

5. The omni-directional air vehicle of claim 1 has multiple ducted fans with counter-rotating propellers.

6. The omni-directional air vehicle of claim 1 wherein the pod has a vehicle body with a round discoid wings.

7. The omni-directional air vehicle of claim 1 wherein the pod has an elongated fuselage and an elongated discoid wing arrangeable perpendicular to the direction of travel.

8. The omni-directional air vehicle of claim 1 having a platform body and articulated wing.

9. The omni-directional air vehicle of claim 1, wherein the counter-rotating propellers are mounted on the projecting arm one above the other.

10. An omni-directional air vehicle of claim 9, wherein the turbofan system is mounted over the pod.

11. An omni-directional air vehicle comprising:

a pod;

a turbofan system connected to the pod the turbofan system having a ducted fan with counter-rotating propellers, a spherical articulation mechanism with a projecting arm on which the propellers are mounted, and a shroud with struts connected to the projecting arm, wherein the pod has a body for seating the spherical articulation mechanism and the ducted fan has counter-rotating electric motors driving the counter-rotating propellers wherein the counter-rotating electric motors are integrated in the shroud around the periphery of the propellers; and, a power source connected to the counter-rotating electric motors.

* * * * *